(12) United States Patent
Pajukoski et al.

(10) Patent No.: US 11,632,280 B2
(45) Date of Patent: Apr. 18, 2023

(54) REFERENCE SIGNAL ARRANGEMENT

(71) Applicant: NOKIA TECHNOLOGIES OY, Espoo (FI)

(72) Inventors: Kari Pekka Pajukoski, Oulu (FI); Esa Tapani Tiirola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/566,946

(22) Filed: Dec. 31, 2021

(65) Prior Publication Data
US 2022/0217030 A1 Jul. 7, 2022

(30) Foreign Application Priority Data
Jan. 4, 2021 (FI) .................... 20215005

(51) Int. Cl.
*H04L 27/26* (2006.01)
*H04J 13/00* (2011.01)

(52) U.S. Cl.
CPC ...... *H04L 27/2613* (2013.01); *H04J 13/0062* (2013.01); *H04L 27/2607* (2013.01)

(58) Field of Classification Search
None
See application file for complete search history.

(56) References Cited

U.S. PATENT DOCUMENTS

| | | | |
|---|---|---|---|
| 2010/0284265 A1 | 11/2010 | Ogawa et al. | |
| 2013/0157667 A1 | 6/2013 | Nakamura et al. | |
| 2014/0177427 A1 | 6/2014 | Yiu et al. | |
| 2018/0241603 A1 | 8/2018 | Jia et al. | |
| 2019/0327053 A1 | 10/2019 | Hu et al. | |
| 2019/0342052 A1 | 11/2019 | Hu et al. | |

FOREIGN PATENT DOCUMENTS

| | | |
|---|---|---|
| CN | 101809881 A | 8/2010 |
| EP | 3 447 982 A1 | 2/2019 |

OTHER PUBLICATIONS

Extended European Search Report corresponding to EP Application No. 21214217.8, dated Jun. 13, 2022.

Motorola, "Selection between Truncation and Cyclic Extension for UL RS Generation", 3GPP RAN WG1 #49, Kobe, Japan, May 7-11, 2007, R1-0712158, 6 pages.

Ericsson, "Uplink reference-signal (DM) structure", TSG-RAN WG1 #49, Kobe, Japan, May 7-11, 2007, R1-072467, 3 pages.

(Continued)

*Primary Examiner* — Hong Shao
(74) *Attorney, Agent, or Firm* — Squire Patton Boggs (US) LLP

(57) ABSTRACT

This document discloses a solution for generating a reference symbol sequence for a radio transmitter. According to an aspect, a method comprises in a transmitter apparatus: generating a Zadoff-Chu sequence for a reference signal; performing a frequency-domain cyclic shift on the Zadoff-Chu sequence; extending the cyclically shifted sequence to a desired length; performing a time-domain cyclic shift on the sequence having the desired length, resulting in a reference symbol sequence; arranging the reference symbol sequence to at least some resource elements of a set of physical resource blocks, and causing transmission of the reference symbol sequence in the set of physical resource blocks.

15 Claims, 7 Drawing Sheets

(56) References Cited

OTHER PUBLICATIONS

Nasarre et al., "Enhanced Uplink Coverage for 5G NR: Frequency-Domain Spectral Shaping With Spectral Extension", IEEE Open Journal of the Communication Society, vol. 2, May 21, 2021, pp. 1188-1204, XP011857883.
Office Action and Search Report dated May 26, 2021 corresponding to Finnish Patent Application No. 20215005.
Communication of Acceptance—section 29 a of Patents Decree dated Sep. 12, 2022, corresponding to Finnish Patent Application No. 20215005.
First Office Action dated Dec. 28, 2022 corresponding to Chinese Patent Application No. 202111663169.1 along with Search Report.

REFERENCE SIGNAL ARRANGEMENT

FIELD

Various embodiments described herein relate to the field of wireless communications and, particularly, to allocation of a demodulation reference signal in a transmitted signal.

BACKGROUND

Methods for reducing a peak-to-average power ratio (PAPR) has been investigated, and it is an important topic in terms of power-efficiency of a transmitter having limited power resources. A terminal device of a cellular communication system is an example of such a transmitter, although power-efficiency is equally important factor in base stations or access nodes of the cellular communication system. The PAPR is affected by various factors, and there are mechanisms to reduce the PAPR. One such a mechanism is to use spectrum extension by providing an excess band one or either side of a band used for transmitting a signal. The excess band(s) may be used to shape the signal such that the PAPR becomes reduced.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: generating a Zadoff-Chu sequence for a reference signal; performing a frequency-domain cyclic shift on the Zadoff-Chu sequence; extending the cyclically shifted sequence to a desired length; performing a time-domain cyclic shift on the sequence having the desired length, resulting in a reference symbol sequence; and arranging the reference symbol sequence to at least some resource elements of a set of physical resource blocks.

In an embodiment, the amount of said frequency-domain cyclic shift is based on a difference between a target length for the reference symbol sequence and the highest prime number smaller than the target length.

In an embodiment, the amount of said frequency-domain cyclic shift is defined by $-0.5(M_{ZC}-N_{ZC}+1)$ or $1-0.5(M_{ZC}-N_{ZC}+1)$ where $M_{ZC}$ is the target length, and $N_{ZC}$ is the highest prime number smaller than $M_{ZC}$.

In an embodiment, the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, wherein the target length is a number of resource elements for the reference symbol sequence in the in-band physical resource blocks.

In an embodiment, the means are configured to extend the cyclically shifted sequence by at least copying a determined number of symbols at a tail of the cyclically shifted sequence to a head of the cyclically shifted sequence and by copying a determined number of symbols at the head to the tail.

In an embodiment, the means are further configured to cyclically extend or truncate, after said copying, the sequence to the desired length.

In an embodiment, the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, and wherein the means are configured to arrange the reference symbol sequence to the set of physical resource blocks such that at least one of the following conditions is satisfied:

a) a reference symbol in a resource element having the highest index in a first out-band physical resource block and a reference symbol in a resource element having the lowest index in a first in-band physical resource block, adjacent to the first out-band physical resource block, are adjacent reference symbols in the Zadoff-Chu sequence;

b) a reference symbol in a resource element having the lowest index in a second out-band physical resource block and a reference symbol in a resource element having the highest index in a second in-band physical resource block, adjacent to the second out-band physical resource block, are adjacent reference symbols in the Zadoff-Chu sequence.

In an embodiment, the set of physical resource blocks comprises a set of in-band physical resource blocks arranged to carry a data signal and, on each side of the set of in-band physical resource blocks, at least one out-band physical resource block for a spectrum shaping signal, and wherein the desired length is $\beta M_{ZC}$ where $\beta$ is a spectral extension factor defining the number of out-band physical resource blocks in the set of physical resource blocks, and wherein $M_{ZC}$ is the number of resource elements for the reference symbol sequence in the in-band physical resource blocks.

In an embodiment, the means are configured to arrange, in an order starting from the first reference symbol, the reference symbol sequence to both said in-band physical resource blocks and said out-band physical resource blocks firstly in an order of increasing resource element index and secondly in an order of increasing physical resource block index.

In an embodiment, all the reference symbols in the reference symbol sequence are in a cyclically increasing order.

In an embodiment, all the reference symbols in the reference symbol sequence are in a cyclically increasing order, except for the first reference symbol at the head of the reference symbol sequence or the last reference symbol at the tail of the reference symbol sequence.

In an embodiment, the means are configured to arrange the reference symbols to the resource elements of the set of physical resource blocks according to the following table where each value, at a location defined by a combination of a physical resource block index and a resource element index, represents an index of the respective reference symbol in the Zadoff-Chu sequence:

| Resource element index | Physical resource block index | | | | | | | |
|---|---|---|---|---|---|---|---|---|
| | 0 | 1 | 2 | 3 | 4 | 5 | 6 | 7 |
| 0 | 10, 11, or 25 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 10, 11, or 25 |

In an embodiment, the means are configured to support both of the following transmission modes:
A) the set of physical resource blocks comprises a set of in-band physical resource blocks arranged to carry a data signal on each side of the set of in-band physical resource blocks, at least one out-band physical resource block for a spectrum shaping signal, and the means are configured to arrange the reference symbol sequence to both in-band and out-band physical resource blocks;
B) the set of physical resource blocks comprises the set of in-band physical resource blocks with no out-band physical resource block for the spectrum shaping signal, and the means are configured to arrange the reference symbol sequence only to the in-band physical resource blocks, wherein the reference symbol sequence arrangement in the in-band physical resource blocks is the same in both transmission modes.

In an embodiment, the means comprise at least one processor and at least one memory including computer program code, the at least one memory and computer program code configured to, with the at least one processor, cause the performance of the apparatus.

According to an aspect, there is provided a method comprising: generating, by a transmitter apparatus, a Zadoff-Chu sequence for a reference signal; performing, by the transmitter apparatus, a frequency-domain cyclic shift on the Zadoff-Chu sequence; extending, by the transmitter apparatus, the cyclically shifted sequence to a desired length; performing, by the transmitter apparatus, a time-domain cyclic shift on the sequence having the desired length, resulting in a reference symbol sequence; arranging, by the transmitter apparatus, the reference symbol sequence to at least some resource elements of a set of physical resource blocks; and transmitting, by the transmitter apparatus, the reference symbol sequence in the set of physical resource blocks.

In an embodiment, the amount of said frequency-domain cyclic shift is based on a difference between a target length for the reference symbol sequence and the highest prime number smaller than the target length.

In an embodiment, the amount of said frequency-domain cyclic shift is defined by $-0.5(M_{ZC}-N_{ZC}+1)$ or $1-0.5(M_{ZC}-N_{ZC}+1)$ where $M_{ZC}$ is the target length, and $N_{ZC}$ is the highest prime number smaller than $M_{ZC}$.

In an embodiment, the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, wherein the target length is a number of resource elements for the reference symbol sequence in the in-band physical resource blocks.

In an embodiment, the transmitter apparatus extends the cyclically shifted sequence by at least copying a determined number of symbols at a tail of the cyclically shifted sequence to a head of the cyclically shifted sequence and by copying a determined number of symbols at the head to the tail.

In an embodiment, the transmitter apparatus cyclically extends or truncates, after said copying, the sequence to the desired length.

In an embodiment, the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, and wherein the transmitter apparatus arranges the reference symbol sequence to the set of physical resource blocks such that at least one of the following conditions is satisfied:
a) a reference symbol in a resource element having the highest index in a first out-band physical resource block and a reference symbol in a resource element having the lowest index in a first in-band physical resource block, adjacent to the first out-band physical resource block, are adjacent reference symbols in the Zadoff-Chu sequence;
b) a reference symbol in a resource element having the lowest index in a second out-band physical resource block and a reference symbol in a resource element having the highest index in a second in-band physical resource block, adjacent to the second out-band physical resource block, are adjacent reference symbols in the Zadoff-Chu sequence.

In an embodiment, the set of physical resource blocks comprises a set of in-band physical resource blocks arranged to carry a data signal and, on each side of the set of in-band physical resource blocks, at least one out-band physical resource block for a spectrum shaping signal, and wherein the desired length is $\beta M_{ZC}$ where $\beta$ is a spectral extension factor defining the number of out-band physical resource blocks in the set of physical resource blocks, and wherein $M_{ZC}$ is the number of resource elements for the reference symbol sequence in the in-band physical resource blocks.

In an embodiment, the transmitter apparatus arranges, in an order starting from the first reference symbol, the reference symbol sequence to both said in-band physical resource blocks and said out-band physical resource blocks firstly in an order of increasing resource element index and secondly in an order of increasing physical resource block index.

In an embodiment, all the reference symbols in the reference symbol sequence are in a cyclically increasing order.

In an embodiment, all the reference symbols in the reference symbol sequence are in a cyclically increasing order, except for the first reference symbol at the head of the reference symbol sequence or the last reference symbol at the tail of the reference symbol sequence.

In an embodiment, the transmitter apparatus arranges the reference symbols to the resource elements of the set of physical resource blocks according to the following table where each value, at a location defined by a combination of a physical resource block index and a resource element index, represents an index of the respective reference symbol in the Zadoff-Chu sequence:

| Resource element index | Physical resource block index | | | | | | | |
|---|---|---|---|---|---|---|---|---|
| | 0 | 1 | 2 | 3 | 4 | 5 | 6 | 7 |
| 0 | 10, 11, or 25 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 10, 11, or 25 |

In an embodiment, the transmitter apparatus supports both of the following transmission modes:
A) the set of physical resource blocks comprises a set of in-band physical resource blocks arranged to carry a data signal on each side of the set of in-band physical resource blocks, at least one out-band physical resource block for a spectrum shaping signal, and the means are configured to arrange the reference symbol sequence to both in-band and out-band physical resource blocks;
B) the set of physical resource blocks comprises the set of in-band physical resource blocks with no out-band physical resource block for the spectrum shaping signal, and the means are configured to arrange the reference symbol sequence only to the in-band physical resource blocks, wherein the reference symbol sequence arrangement in the in-band physical resource blocks is the same in both transmission modes.

According to an aspect, there is provided a computer program product embodied on a computer-readable medium and comprising a computer program code readable by a computer, wherein the computer program code configures the computer to carry out a computer process comprising: generating a Zadoff-Chu sequence for a reference signal; performing a frequency-domain cyclic shift on the Zadoff-Chu sequence; extending the cyclically shifted sequence to a desired length; performing a time-domain cyclic shift on the sequence having the desired length, resulting in a reference symbol sequence; arranging the reference symbol sequence to at least some resource elements of a set of physical resource blocks, and causing transmission of the reference symbol sequence in the set of physical resource blocks.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
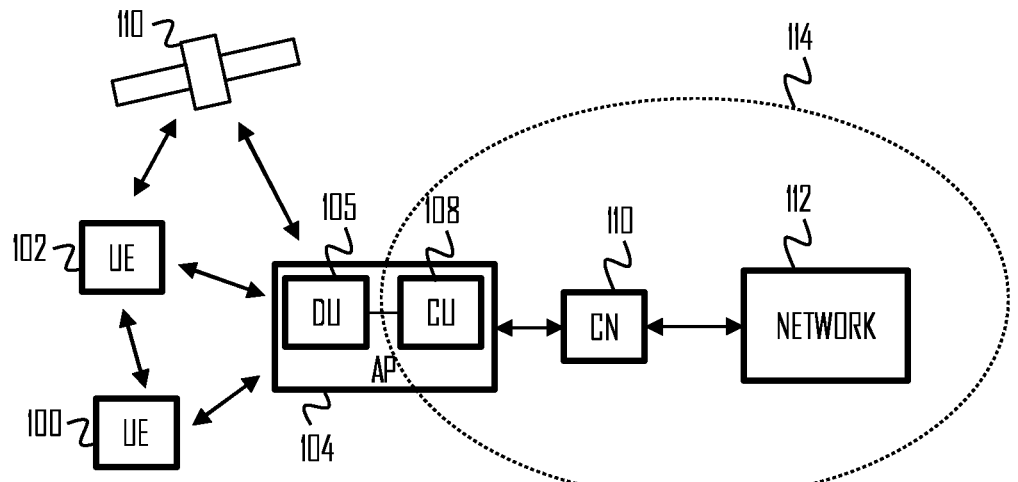

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Spectrum shaping capability has been developed to the modern cellular communication systems. In a simplified form, the spectrum shaping introduces extension resources for transmission, and these extension resources may be used to modify spectral properties of a signal being transmitted. The purpose of the spectrum shaping may be to shape the spectrum such that the peak-to-average power ratio (PAPR) described in Background and/or maximum power reduction (MPR) can be reduced, thus providing improvements in radio coverage. The MPR relates to limiting a maximum transmission power reduction of a terminal device in an attempt to control radio emissions towards the user. The MPR may be understood as allowed reduction of maximum power level (power backoff) a terminal device can use, for example for a given modulation scheme. The MPR depends on a signal waveform, e.g. an orthogonal frequency division multiplexing (OFDM) waveform has a larger PAPR than a discrete Fourier transform spread orthogonal frequency division multiplexing (DFT-S-OFDM) waveform and, thus, requires a larger MPR value. Spectrum shaping can enable smaller MPR (at least for certain scenarios), resulting in higher effective transmit power and improved coverage. In some systems, the spectrum shaping is applied with or without the extension resource.

Figure 2:
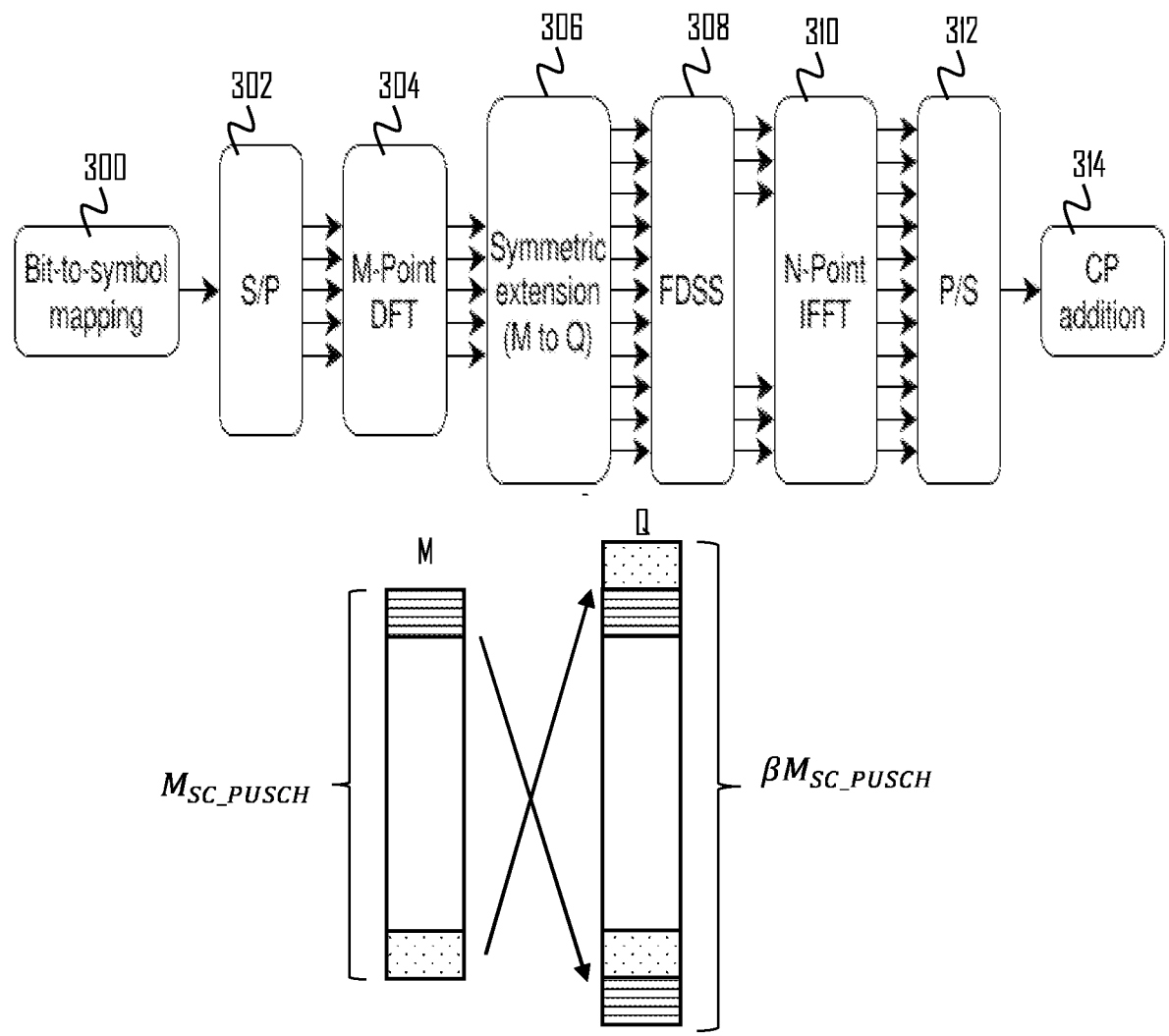
FIG. 2 illustrates functional blocks of a transmitter performing spectrum shaping.

FIG. 2 illustrates a system supporting the spectrum shaping with the extension resources, although a transmitter may decide whether or not to use the extension resource. A criterion for the decision may be properties of scheduled resource allocations. The transmitter of FIG. 2 is a DFT-S-OFDM transmitter that is in the LTE and 5G systems the terminal device. However, the spectral extension may be equally applied to downlink transmissions where the transmitter may be an OFDM transmitter without the DFT-spreading, or the DFT-S-OFDM transmitter.

Referring to FIG. 2, bits to be transmitted are translated in to symbols according to a selected modulation scheme in block 300. Then, the symbols are converted from a serial form to a parallel form (S/P) in block 302 and subjected to an M-point DFT in block 304. These are standard blocks of an LTE or 5G transmitter, so they are not described in greater detail. In the example illustrated in FIG. 2, the extension blocks are then generated in block 306 via symmetric extension where a certain number of frequency bins at one end of the spectrum are copied to the other end of the spectrum. Similarly, a certain number (same or different) of frequency bins at the other end of the spectrum are copied (or mirrored) to the one end of the spectrum, as illustrated in FIG. 2. In other words, a block of symbols at a lower end of the spectrum is copied to the higher end of the spectrum and vice versa. Accordingly, the length $M_{SC\_PUSCH}$ of the signal is extended to by a spectral extension factor β to $βM_{SC\_PUSCH}$, where $M_{SC\_PUSCH}$ denotes a number of frequency-domain resource elements scheduled to a terminal device on a physical uplink shared channel (PUSCH). In case of a DFT-S-OFDM transmitter, the frequency-domain resource element may be understood as a virtual sub-carrier. A similar arrangement can be defined for downlink. In some examples, filtering is applied in a frequency domain spectrum shaping block 308 to the signals at the extensions to improve the spectrum shaping properties. This may provide or improve the above-described advantages. Thereafter, the filtered signal may be inverse-transformed in an inverse DFT (I-DFT) block 310, returned to the serial form in block 312, and a cyclic prefix may be added to the resulting signal in block 314.

Now, the signal being transmitted and processed in blocks 300 to 314 may comprise data and signalling information, e.g. a reference signal for channel estimation that is used at a receiver to demodulate and decode the data. The symbols. The same spectrum shaping filtering may be applied to both data and the reference signal so as to facilitate the receiver operation. For the same purpose, it would be advantageous that the data and the demodulation reference signal would be transmitted with substantially the same transmission power. Accordingly, it would be advantageous that the PAPR properties of the data and the reference signal would be close to each other. As an alternative to the PAPR, cubic metric is sometimes used in the literature to describe the same technical feature than the PAPR. The cubic metric (CM) is a metric of actual reduction in power capability, or power de-rating, of a power amplifier of the terminal device. The cubic metric has been considered as a more accurate metric of the true distortion in the power amplifier than the PAPR. In the context of the embodiments described herein, either metric is substantially applicable.

Conventionally, Zadoff-Chu sequences are used as a basis for the reference signals because of their performance in terms of autocorrelation and cross-correlation properties. However, straightforward mirroring of a conventional reference signal in block 306 may result in that the reference signal will experience different PAPR properties than the data, thus causing the transmission of the reference signal with a different transmission power than the data. Let us take for an example β=4/3 and a demodulation reference signal generated according to Release 15 or Release 16 of the 5G specifications. Mapping such a demodulation reference signal to six physical resource blocks (PRBs, each consisting of 12 sub-carriers) with the spectral extension and shaping would result in the mapping of the demodulation reference signal illustrated in Table 1. In Table 1, the rows indicate indices of resource elements in each PRB while the columns indicate the PRB index. PRBs 1 to 6 are so-called in-band resource blocks that carry a payload signal being transmitted, the data and demodulation reference symbols of the demodulation reference signal. PRBs 0 and 7 are out-band PRBs that carry the spectral extensions.

TABLE 1

| Resource element | Physical resource block index | | | | | | | |
|---|---|---|---|---|---|---|---|---|
| index | 0 | 1 | 2 | 3 | 4 | 5 | 6 | 7 |
| 0 | 30 | 0 | 6 | 12 | 18 | 24 | 30 | 0 |
| 2 | 0 | 1 | 7 | 13 | 19 | 25 | 0 | 1 |
| 4 | 1 | 2 | 8 | 14 | 20 | 26 | 1 | 2 |
| 6 | 2 | 3 | 9 | 15 | 21 | 27 | 2 | 3 |
| 8 | 3 | 4 | 10 | 16 | 22 | 28 | 3 | 4 |
| 10 | 4 | 5 | 11 | 17 | 23 | 29 | 4 | 5 |

As described above, the demodulation reference signal is mirrored such that the in-band PRB 6 is mirrored to the out-band PRB 0 and the in-band PRB 1 is mirrored to the out-band PRB 7. It has been observed that this type of arrangement of the reference signal results in that the reference signal will acquire a higher PAPR than the data carried in the same PRBs. This will result in that the reference signal will be transmitted with a lower transmission power than the data, thus potentially causing detection/decoding/coverage issues. It should be appreciated that Table 1 is only an example and, in practical implementations the scheduled PRBs may have a different size and spectral pattern. For example, PRBs 0, 2, 4, and 6 may be scheduled to one terminal device while PRBs 1, 3, 5, and 7 may be scheduled to another terminal device.

Figure 3:
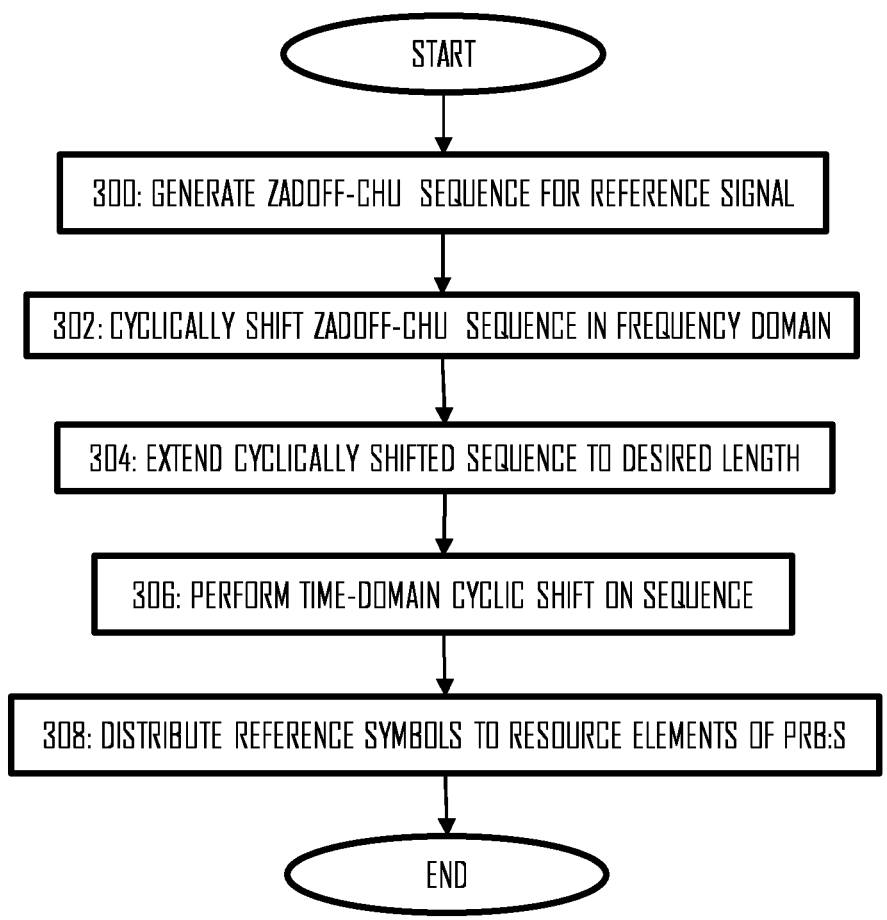
FIG. 3 illustrates a process for generating a reference symbol sequence according to an embodiment.

FIG. 3 illustrates an embodiment of a process for generating a reference signal. The process may be carried out in a transmitter apparatus that may be the terminal device or the access node described above in connection with FIG. 1. The apparatus carrying out the process of FIG. 3 may be comprised in such an apparatus, e.g. as a chipset or a transmission circuitry for the transmitter apparatus. Referring to FIG. 3, the process comprises: generating a Zadoff-Chu sequence for the reference signal (block 300); performing (block 302) a frequency-domain cyclic shift on the Zadoff-Chu sequence; extending (block 304) the cyclically shifted sequence to a desired length; performing (block 306) a time-domain cyclic shift on the sequence having the desired length, resulting in a reference symbol sequence; and arranging (block 308) the reference symbol sequence to at least some resource elements of a set of physical resource blocks.

In an embodiment, the Zadoff-Chu sequence is a Zadoff-Chu sequence.

In an embodiment, the reference symbols and the reference signal form a demodulation reference signal or a sounding reference signal for a cellular communication system.

With the procedure of FIG. 3, a reference signal with improved PAPR properties can be generated. In particular, the PAPR of the reference signal is closer to the PAPR of the data transmitted in the other resource elements transmitted together with the reference signal, thus improving performance of symbol detection and decoding in the receiver. The PAPR properties result substantially from the operations in blocks 302 and 304, particularly block 302. A technical effect of block 306 is to generate multiple reference symbol sequences from the same sequence resulting from blocks 300 to 304. In some embodiments, block 306 may even be omitted and still the desired PAPR property may be acquired. The cyclic shift may be unique to a terminal device, for example, so that each terminal device is assigned with a unique reference symbol sequence that can be distinguished in the receiver and avoids interference between the terminal devices. Each reference symbol sequence enjoys substantially similar PAPR properties.

In an embodiment, the Zadoff-Chu sequence in block 300 is generated according to the 3GPP specifications of Release 15 or Release 16 of the 5G. Accordingly, the same (legacy) Zadoff-Chu sequence generator may be used in this embodiment as in the state-of-the-art, thus reducing the complexity of the design.

As defined in the 5G specifications for a demodulation reference signal, a low-PAPR sequence $r_{u,v}^{(\alpha,\delta)}(n)$ is defined by a cyclic shift α of a base sequence $\bar{r}_{u,v}(n)$ according to $$r_{u,v}^{(\alpha,\delta)}(n)=e^{j\alpha n}\bar{r}_{u,v}(n), 0 \le n < M_{ZC}$$

where $M_{ZC}=mN_{sc}^{RB}/2^{\delta}$ is the length of the sequence and $N_{sc}^{RB}$ is the number of sub-carriers (resource elements) in a PRB, and m denotes the number of in-band PRBs. Multiple sequences are defined from a single base sequence through different values of α and δ.

Base sequences $\bar{r}_{u,v}(n)$ are divided into groups, where u∈{0, 1, . . . , 29} is the group number and v is the base sequence number within the group, such that each group contains one base sequence (v=0) of each length $M_{ZC}=mN_{sc}^{RB}/2^{\delta}$, $$\frac{1}{2} \le \frac{m}{2^\delta} \le 5$$

and two base sequences (v=0,1) of each length $M_{ZC}=M_{ZC}=mN_{sc}^{RB}/2^\delta$, $$6 \le \frac{m}{2^\delta}.$$

The definition of the base sequence $\bar{r}_{u,v}(0), \ldots, \bar{r}_{u,v}(M_{ZC}-1)$ depends on the sequence length $M_{ZC}$. For $M_{ZC} \ge 3N_{sc}^{RB}$, the base sequence $\bar{r}_{u,v}(0), \ldots, \bar{r}_{u,v}(M_{ZC}-1)$ is given by $$\bar{r}_{u,v}(n) = x_q(n \bmod N_{ZC})$$
$$x_q(m) = e^{-j\frac{\pi qm(m+1)}{N_{ZC}}}$$

where $$q = \lfloor \bar{q}+1/2 \rfloor + v \cdot (-1)^{\lfloor 2\bar{q} \rfloor}$$
$$\bar{q} = N_{ZC} \cdot (u+1)/31$$

The length $N_{ZC}$ is given by the largest prime number such that $N_{ZC} < M_{ZC}$.

In the embodiments described in FIG. 3 and below, the Zadoff-Chu sequence in block 300 may be generated by using the same Zadoff-Chu sequence generator as that providing the basis for the base sequence according to the 3GPP specifications. The sequence generator may output a Zadoff-Chu sequence having the length $N_{ZC}$, as described in the embodiments below. As described in connection with Table 1, this Zadoff-Chu sequence may be extended to the desired length, e.g. $M_{ZC}$, thus providing the base sequence. In the embodiments described herein, the Zadoff-Chu sequence may equally be generated by using a different Zadoff-Chu sequence, the Zadoff-Chu sequence described in connection with the embodiments may be generated by using various Zadoff-Chu sequence generators for the reference symbols.

Figure 4:
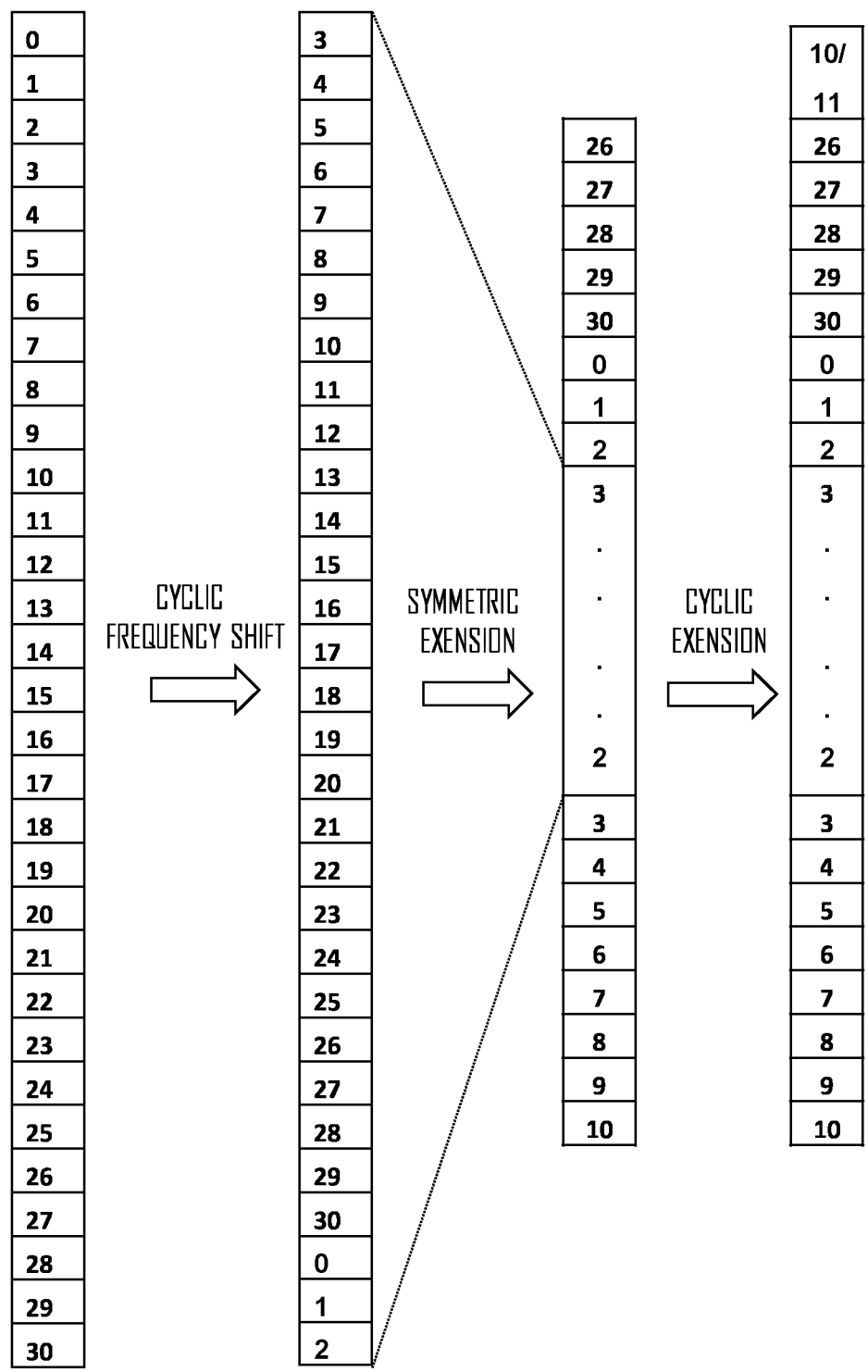
FIGS. 4 to 6 illustrate various embodiments for generating the reference symbol sequence with improved properties.
Figure 5:
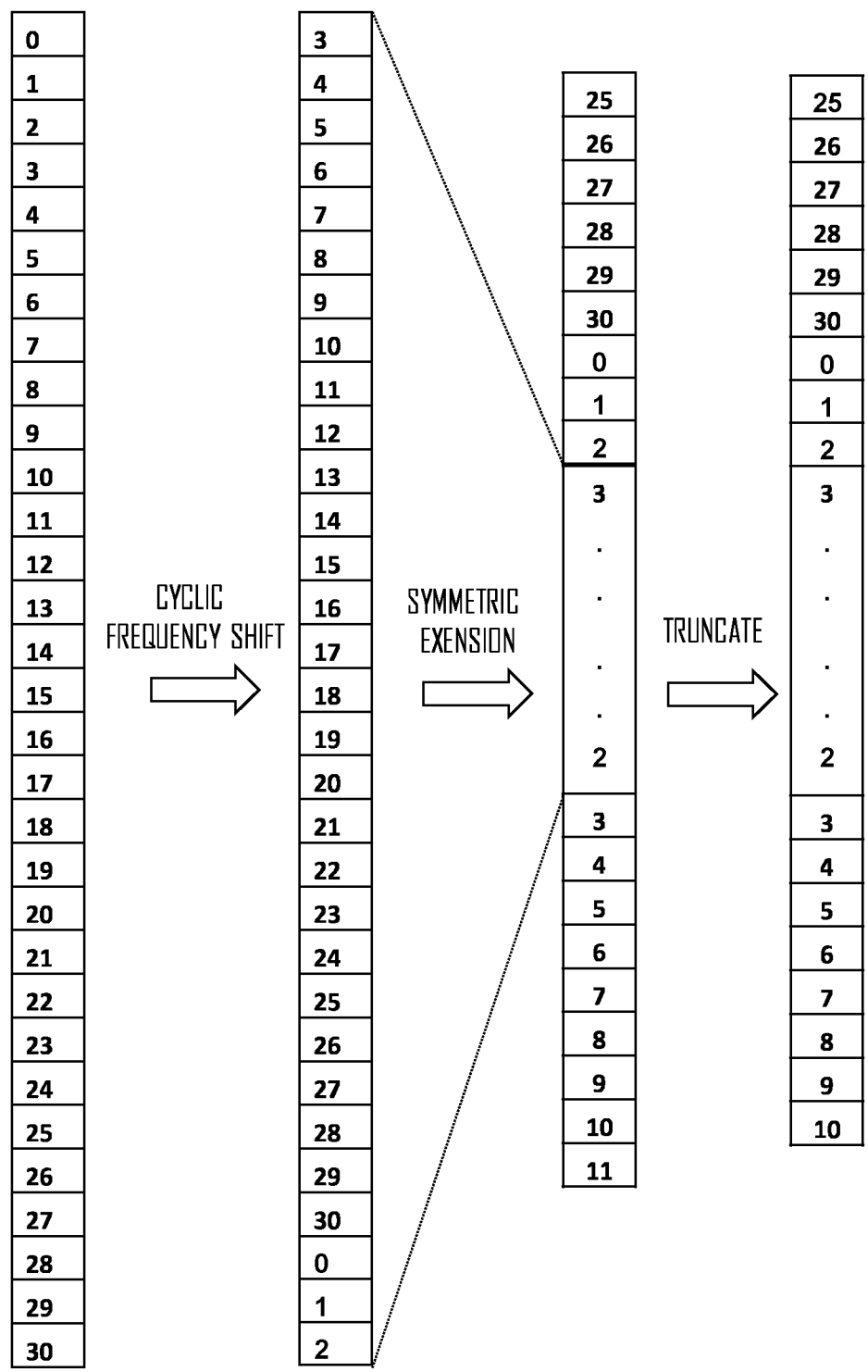
Figure 6:
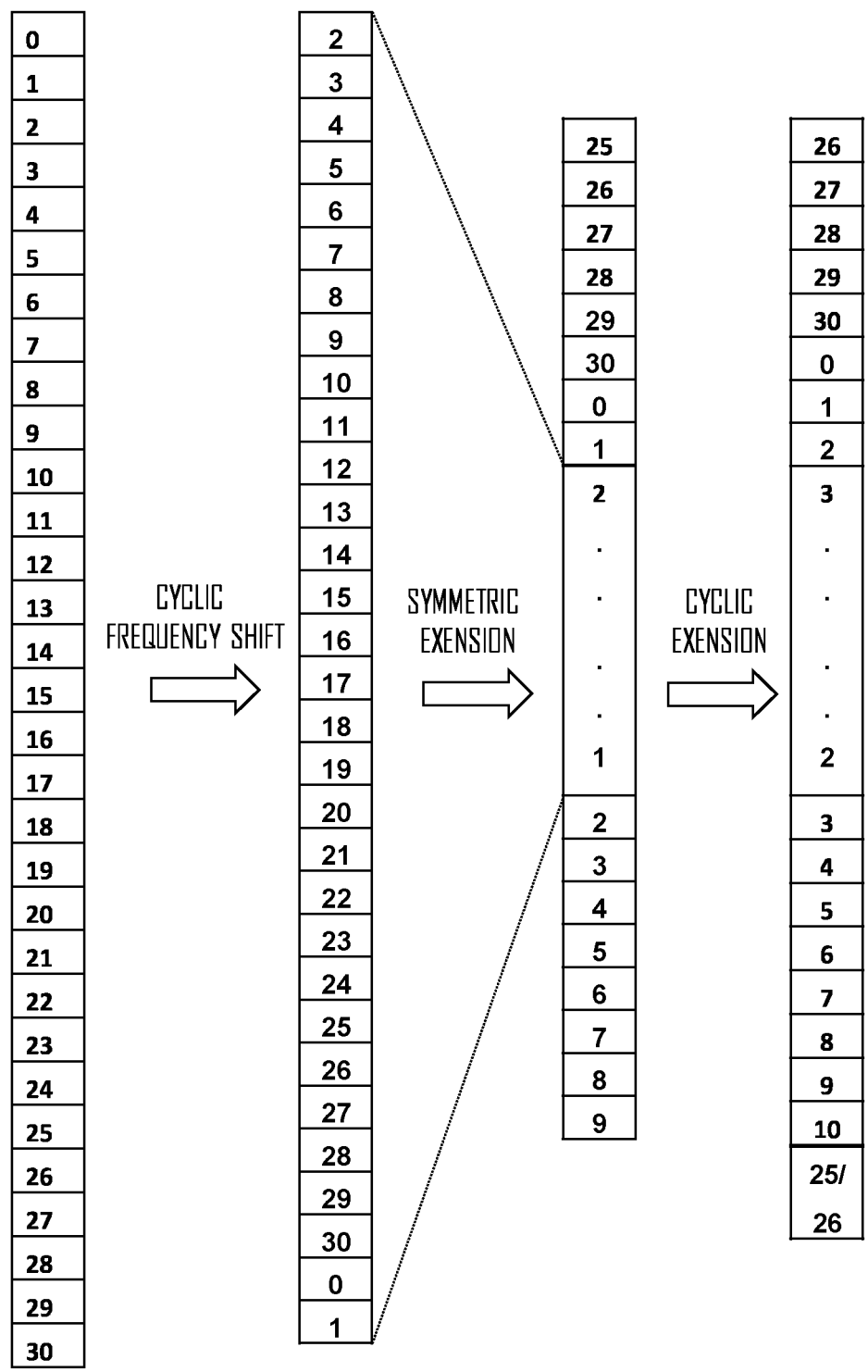

In an embodiment, the amount of said frequency-domain cyclic shift (block 302) is based on a difference between a target length $M_{ZC}$ of the reference symbol sequence and the highest prime number $N_{ZC}$ smaller than $M_{ZC}$. The target length $M_{ZC}$ of the reference symbol sequence may be defined as the number of resource elements allocated to the reference signal in in-band PRBs currently scheduled to the terminal device, for uplink or downlink transmission. From another perspective, $M_{ZC}$. Is the number of resource elements for the reference symbol sequence in the in-band PRBs. For example, in the example of Table 1, $M_{ZC}=36$. FIGS. 4 to 6 illustrate some embodiments for the amount of frequency-domain cyclic shift, and the amount may be defined in the respective embodiments as:

$$-0.5(M_{ZC}-N_{ZC}+1) \text{ or}$$

$$1-0.5(M_{ZC}-N_{ZC}+1)$$

In an embodiment, the extending in block 304 is performed by copying a determined number of symbols at a tail of the cyclically shifted sequence to a head of the cyclically shifted sequence and by copying a determined of symbols at the head to the tail. This corresponds to the mirroring described above but, thanks to the frequency-domain cyclic shift in block 302, the PAPR degradation described above can be avoided.

In an embodiment, block 304 further comprises cyclically extending or truncating, after said copying, the sequence to the desired length. In this manner, a reference symbol sequence having the desired length can be acquired. The length may correspond to the number of resource elements allocated to the reference signal in the PRBs, including the in-band PRBs and the out-band PRBs.

Let us then describe in greater detail embodiments of the functions carried out in blocks 302 and 304 with reference to FIGS. 4 to 6. In all embodiments, $M_{ZC}=36$ but the embodiments are directly applicable to longer and shorter demodulation reference symbol sequences as well. Let us also assume that a spectral extension factor β=4/3 which means that the total number of PRBs is 4/3 times the number of in-band PRBs scheduled to the transmitter apparatus. Referring to FIG. 4, the Zadoff-Chu sequence output from the Zadoff-Chu sequence generator is illustrated on the left-hand side of FIG. 4 where each value represents an index of the respective symbol in the Zadoff-Chu sequence. The length of the Zadoff-Chu sequence is $N_{ZC}$. Now, the cyclic frequency-shifting is performed according to $$-0.5(M_{ZC}-N_{ZC}+1),$$

resulting in a circular shift of (minus) three (3) symbols, represented by the sequence starting with symbol '3' and ending with symbol '2' in FIG. 4. The next steps illustrate the extension that comprises two phases: the symmetric extension (mirroring) and the cyclic extension. In the symmetric extension, a target length for the symmetric extension may first be defined on the basis of β as $\beta M_{ZC}-1$ which, in this example, is 4/3*36−1=47. Since the length of the Zadoff-Chu sequence is now 31 symbols, 16 symbols have to be added to the Zadoff-Chu sequence. Considering that the same number of symbols shall be mirrored to the head and to the tail of the shifted Zadoff-Chu sequence, it means that eight symbols per side shall be mirrored. Accordingly, eight symbols from the head of the shifted Zadoff-Chu sequence may be copied to the tail and eight symbols from the tail of the shifted Zadoff-Chu sequence may be copied to the head. This is illustrated in FIG. 4 by the sequence following the symmetric extension. Accordingly, symbols having indices from 26 to 2 from the tail are copied to the head, and symbols having indices from 3 to 10 are copied from the head to the tail. The reader is advised that the shifted Zadoff-Chu sequence is visually reduced to a smaller size in the two right-most sequences of FIG. 4 for the sake of practical illustration.

In the second step, the final length for the reference symbol sequence $\beta M_{ZC}$ is reached by cyclically extending the sequence resulting from the symmetric extension. The cyclic extension means that the sequence is continued either at the head or at the tail according to a symbol value at the tail or at the head of the sequence, respectively. In the embodiment of FIG. 4, the cyclic extension is performed by adding the symbol (or the symbol having a subsequent index) at the tail of the sequence to the head of the sequence. It means that either the symbol having index '10' or index '11' is added to the head to reach the final length, thus resulting in the final form of the reference symbol sequence. Either value is suitable in terms of the desired PAPR property. After arranging the reference symbol sequence embodiment of FIG. 4 to the resource elements of the in-band and out-band PRBs, the arrangement of Table 2 is formed:

TABLE 2

| Resource element index | Physical resource block index | | | | | | | |
|---|---|---|---|---|---|---|---|---|
| | 0 | 1 | 2 | 3 | 4 | 5 | 6 | 7 |
| 0 | 10 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 10 |

As seen in Table 2, the in-band reference symbols are the same as in the conventional solution, thus providing compatibility with legacy devices that do not support the spectral shaping by using the extension resources. This allows e.g. multi-user multiple-input-multiple-output (MU-MIMO) pairing between demodulation reference signals (DMRS) of different terminal device types: legacy devices and devices using FDSS with the spectrum extension. Furthermore, this arrangement improves the PAPR properties such that the PAPR of the reference signal is close to the PAPR of the data, thus improving the performance of the detection and decoding at the receiver.

Let us then clarify the frequency-domain cyclic shift. As illustrated in Tables 1 and 2, the reference symbol sequence is arranged to the resource elements that are all included in the same 'multi-carrier' symbol, e.g. a DFT-S-OFDM symbol. Since all reference symbols are arranged to the same time-domain multi-carrier symbol, the shifting in block 304 is performed in the frequency-domain.

FIG. 5 illustrates another embodiment of block 304. The cyclic shifting may be carried out in the same manner as in the embodiment of FIG. 4, as illustrated on the left-hand side of FIG. 5. In the embodiment of FIG. 5, the symmetrical extension is performed such that the target length for the symmetric extension is now defined as $\beta M_{ZC}+1$ which, in this example, is 4/3*36+1=49. Accordingly, the target length is slightly longer than the final length. Since the length of the Zadoff-Chu sequence is now 31 symbols, 18 symbols have to be added to the Zadoff-Chu sequence. Considering that the same number of symbols shall be mirrored to the head and to the tail of the shifted Zadoff-Chu sequence, it means that nine symbols per side shall be mirrored. Accordingly, nine symbols from the head of the shifted Zadoff-Chu sequence may be copied to the tail and nine symbols from the tail of the shifted Zadoff-Chu sequence may be copied to the head. This is illustrated in FIG. 5 by the sequence following the symmetric extension. Accordingly, symbols having indices from 25 to 2 from the tail are copied to the head, and symbols having indices from 3 to 11 are copied from the head to the tail. Thereafter, the final length for the reference symbol sequence is acquired by truncating the symbol to the final length, e.g. by truncating the last symbol (index '11') of the sequence, resulting in the final reference symbol sequence having the length of 48 symbols. After arranging the reference symbol sequence embodiment of FIG. 5 to the resource elements of the in-band and out-band PRBs, the arrangement of Table 3 is formed:

TABLE 3

| Resource element index | Physical resource block index | | | | | | | |
|---|---|---|---|---|---|---|---|---|
| | 0 | 1 | 2 | 3 | 4 | 5 | 6 | 7 |
| 0 | 25 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 10 |

As seen in Table 3, the in-band reference symbols are the same as in the conventional solution and in the embodiment of FIG. 4, thus providing compatibility with the legacy devices and, further, improving the PAPR properties such that the PAPR of the reference signal is close to the PAPR of the data.

FIG. 6 illustrates another embodiment of blocks 302 and 304. As in FIG. 4, the Zadoff-Chu sequence output from the Zadoff-Chu sequence generator is illustrated on the left-hand side of FIG. 6. Now, the cyclic frequency-shifting is performed according to $$1-0.5(M_{ZC}-N_{ZC}+1),$$

resulting in a circular shift of (minus) two (2) symbols, represented by the sequence starting with symbol '2' and ending with symbol '1' in FIG. 6. The next steps illustrate the extension that comprises two phases: the symmetric extension (mirroring) and the cyclic extension that may be executed in the same manner as in the embodiment of FIG. 4. Since the cyclic shift is now different, the resulting sequence is also different than in the embodiment of FIG. 4. The target length for the symmetric extension is the same $\beta M_{ZC}-1$, resulting in 4/3*36-1=47 symbols. Since the length of the Zadoff-Chu sequence is again 31 symbols, 16 symbols have to be added to the Zadoff-Chu sequence. Accordingly, eight symbols from the head of the shifted Zadoff-Chu sequence may be copied to the tail and eight symbols from the tail of the shifted Zadoff-Chu sequence may be copied to the head. This is illustrated in FIG. 6 by the sequence following the symmetric extension. Accordingly, symbols having indices from 25 to 1 from the tail are copied to the head, and symbols having indices from 2 to 9 are copied from the head to the tail.

In the second step, the final length for the reference symbol sequence $\beta M_{ZC}$ is reached by cyclically extending the sequence resulting from the symmetric extension. The cyclic extension means that the sequence is continued either at the head or at the tail according to a symbol value at the tail or at the head of the sequence, respectively. In the embodiment of FIG. 6, the cyclic extension is performed by adding the symbol (or the symbol having a subsequent index) at the head of the sequence to the tail of the sequence. It means that either the symbol having index '25' or index '26' is added to the head to reach the final length, thus resulting in the final form of the reference symbol sequence. Either value is suitable in terms of the desired PAPR property. After arranging the reference symbol sequence embodiment of FIG. 6 to the resource elements of the in-band and out-band PRBs, the arrangement of Table 4 is formed:

TABLE 4

| Resource element index | Physical resource block index | | | | | | | |
|---|---|---|---|---|---|---|---|---|
| | 0 | 1 | 2 | 3 | 4 | 5 | 6 | 7 |
| 0 | 25 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 25 or 26 |

As seen in Table 4, the in-band reference symbols are the same as in the conventional solution and in the embodiment of FIGS. 4 and 5, thus providing compatibility with the legacy devices and, further, improving the PAPR properties such that the PAPR of the reference signal is close to the PAPR of the data.

As described above, the principles described above in connection with FIG. 4 and are directly applicable to other embodiments having different values for β, $M_{ZC}$, and $N_{ZC}$.

It should be appreciated that the resource element index and the PRB index in the Tables above are described in view of the PRBs and resource elements scheduled to the terminal device. Therefore, their values may equal to absolute PRB and resource element indices of the system, e.g. when the terminal device is scheduled with adjacent PRBs. However, they may differ from the absolute PRB and resource element indices of the system, e.g. when the terminal device is scheduled with non-adjacent PRBs. Accordingly, the indices may be understood to be relative with respect to the absolute system indices.

Certain similarities can be observed in the reference symbol allocations in Tables 2 to 4 that distinguish the allocations from the allocation of Table 1 and that contribute to the improvement of the PAPR. As described above, the set of in-band PRBs may be arranged to carry the data signal and some of the reference symbols and, on each side of the set of in-band PRBs, at least one out-band PRB for the spectrum shaping signal, each out-band PRB comprising resource elements for the reference signal as well. The reference symbols may be arranged to the in-band and out-band PRBs such that at least one of the following conditions is satisfied: a) a reference symbol in a resource element having the highest index in a first out-band PRB and a reference symbol in a resource element having the lowest index in a first in-band PRB, adjacent to the first out-band PRB, are adjacent demodulation reference symbols in the Zadoff-Chu sequence and in the cyclically extended sequence (the final sequence on the right in any one of FIGS. 4 to 6); b) a reference symbol in a resource element having the lowest index in a second out-band PRB and a demodulation reference symbol in a resource element having the highest index in a second in-band PRB, adjacent to the second out-band PRB, are adjacent reference symbols in the Zadoff-Chu sequence and in the cyclically extended sequence. With respect to the condition a) in Tables 2 to 4, the last reference symbol in PRB 0 (reference symbol index '30') and the first reference symbol in the PRB 1 (reference symbol index '0') are adjacent in the Zadoff-Chu sequence (consecutive symbol indices) and in the final sequences of FIGS. 4 to 6. Similarly, the first reference symbol in PRB 7 (reference symbol index '5') and the last reference symbol in the PRB 6 (reference symbol index '4') are adjacent in the Zadoff-Chu sequence (consecutive symbol indices) and in the final sequences of FIGS. 4 to 6.

The reference symbols of the final sequence in the embodiments of FIGS. 4 to 6 may be arranged to the form of the respective Tables 2 to 4 in an order, starting from the first symbol, to both said in-band PRBs and said out-band PRBs firstly in an order of increasing resource element index and secondly in an order of increasing physical resource block index. Referring to Tables 2 to 4, the resource elements of PRB 0 may be filled first with the first reference symbols of the final sequence, starting from the lowest resource element index. Then, PRB 1 may be filled and so on as illustrated in Tables 2 to 4.

In some embodiments, e.g. the embodiment of FIG. 5 and Table 3, all the reference symbols in the final reference symbol sequence are in a cyclically increasing order.

In other embodiments, e.g. the embodiments of FIGS. 4 and 6 and Tables 2 and 4, all the reference symbols in the final reference symbol sequence are in a cyclically increasing order, except for the first reference symbol at the head of the sequence (the embodiment of FIG. 4 and Table 2) or the last reference symbol at the tail of the sequence (the embodiment of FIG. 6 and Table 4).

In an embodiment, the time-domain cyclic shift performed in block 306 is dependent on the parameter a configured to the apparatus performing the process of FIG. 3 or any one of the embodiments described above in connection with FIGS. 4 to 6.

Figure 7:
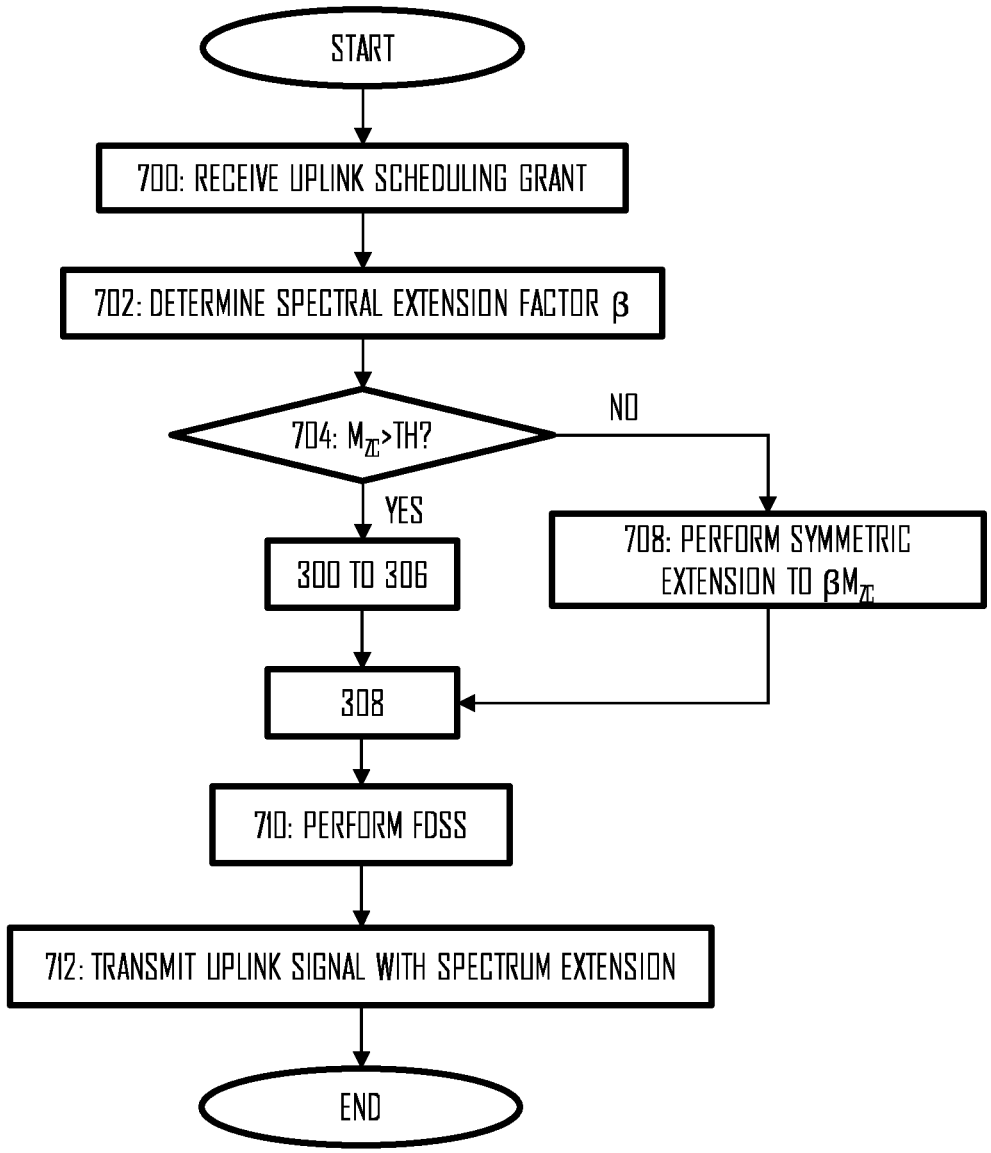
FIG. 7 illustrates an embodiment of a process for performing selection between a conventional reference symbol sequence generation method and a reference symbol sequence generation method according to any one of FIGS. 3 to 6.

In an embodiment, any one of the embodiments described supports the conventional procedure for generating the reference symbol sequence. An embodiment comprises a decision logic for determining whether to follow the conventional reference symbol sequence generation or reference symbol generation according to any one of the embodiments described above. For example, the apparatus performing block 308 may determine whether or not to fill every resource element of the allocated PRBs. For example, the apparatus may determine not to utilize the spectral extension and, thus, not fill the out-band PRBs at all. In such an embodiment, the conventional reference symbol generation may be used. The decision of the usage of the spectral extension may be based on configuration made by the access node or autonomous decision of the terminal device. For example, the spectral extension may be controlled by a radio resource control layer in the access node, or it may be configured per scheduling grant. In case of autonomous decision of the terminal device, the out-band PRBs or simply a set of PRBs may be configured in a scheduling grant and the terminal device may determine whether or not to use some of the PRBs for the spectral extension and spectrum shaping. As another example, the apparatus may use the spectral extension but not all allocated in-band PRBs, e.g. in case there is not as much data to transmit as would fit into the allocated PRBs. In such a case, some resource elements proximate to unfilled data resource elements may be left void of the reference symbol as well. If the spectral extension is used, the reference symbol sequence may be generated according to any one of the embodiments described above to have the desired PAPR properties. FIG. 7 illustrates an embodiment $M_{ZC}$ is used as a parameter for the decision logic. FIG. 7 is disclosed for uplink but can be applied to downlink in a straightforward manner.

Referring to FIG. 7, the terminal device receives a scheduling grant in block 700, the scheduling grant allocating a set of PRBs to the terminal device. The scheduling grant can be e.g. downlink control information (DCI) format 0_0 or 0_1. Alternatively, or additionally, it may involve higher layer signalling, such as RRC (Radio resource control). In block 702, the terminal device determines the spectral extension factor β. This may be determined e.g. based on the scheduling grant and/or based on higher layer signalling. In block 704, a reference symbol sequence generation method is selected on the basis of $M_{ZC}$. If $M_{ZC}$ is smaller than a threshold TH, the conventional method is used in block 708 by using the symmetric extension of the reference symbols from the in-band PRBs to the out-band PRBs without the preceding cyclic shifting. If $M_{ZC}$ is greater than or equal to the threshold TH, blocks 300 to 306 may be used to generate the reference symbol sequence, thus gaining the benefits of the improved PAPR. After generating the reference symbol sequence, block 308 may be performed to distribute the reference symbols to the PRBs. In block 710, the frequency-domain spectral shaping (FDSS) is performed to shape the spectrum and, thereafter in block 712, the uplink signal with spectral shaping realized by the signal(s) in the out-band PRBs is transmitted in the resource allocated in the scheduling grant.

In an embodiment, the threshold is 36 such that the number of allocated in-band PRBs is greater than or equal to six (6).

According to the embodiment of FIG. 7, the apparatus carrying out the process of FIG. 7 may support the following transmission modes:

A) the set of physical resource blocks comprises a set of in-band physical resource blocks arranged to carry a data signal on each side of the set of in-band physical resource blocks, at least one out-band physical resource block for a spectrum shaping signal, and the means are configured to arrange the reference symbol sequence to both in-band and out-band physical resource blocks;

B) the set of physical resource blocks comprises the set of in-band physical resource blocks with no out-band physical resource block for the spectrum shaping signal, and the means are configured to arrange the reference symbol sequence only to the in-band physical resource blocks.

The transmission mode A may be performed according to any one of the above-described embodiments. The transmission mode B may be performed as described above in connection with Table 1. In both transmission modes A and B, the reference symbol sequence arrangement in the in-band physical resource blocks may be the same, as illustrated in Tables 1 to 4.

In an embodiment, the embodiments described above are applied to the transmission on the PUSCH.

In an embodiment, the embodiments described above are applied to the transmission on a physical uplink control channel (PUCCH).

Figure 8:
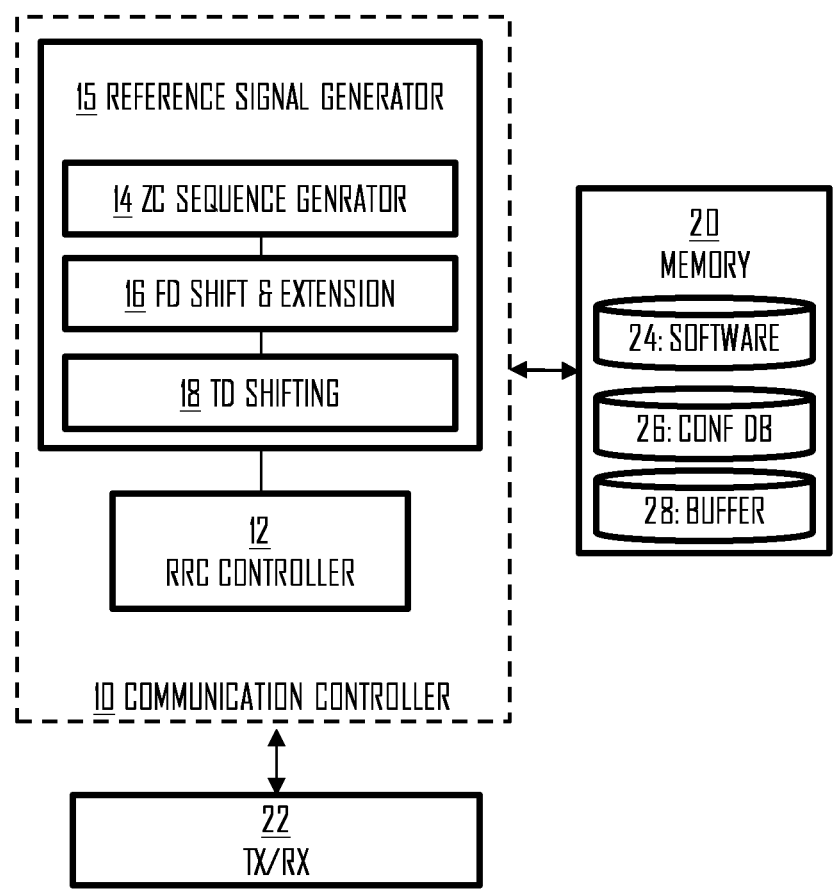
FIG. 8 illustrates a block diagram of a structure of an apparatus according to an embodiment.

FIG. 8 illustrates an apparatus comprising means for carrying out the process of FIG. 3 or any one of the embodiments described above. The apparatus may comprise a processing circuitry, such as at least one processor, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the terminal device 110 or for the access node 104, depending on the embodiment. The apparatus may be a circuitry or an electronic device realizing some embodiments of the invention in the terminal device or access node. The apparatus carrying out the above-described functionalities may thus be comprised in such a device, e.g. the apparatus may comprise a circuitry such as a chip, a chipset, a processor, a micro controller, or a combination of such circuitries for the terminal device or the access node.

The at least one processor or a processing circuitry may realize a communication controller 10 controlling communications in a radio interface of the cellular communication system in the above-described manner. The communication controller may be configured to establish and manage radio connections, transfer of data over the radio connections and transmit the reference symbol sequences generated according to any one of the embodiments described herein.

The communication controller 10 may comprise an RRC controller 12 configured to establish, manage, and terminate radio connections. The RRC controller 12 may be configured, for example, to establish and reconfigure the RRC connections and to determine whether or not to employ the spectrum shaping by using the out-band PRBs.

The communication controller 10 may further comprise a transmission signal processing circuitry configured to carry out the transmission signal processing functions described in connection with FIG. 2, for example. The transmission signal processing circuitry may be configured to perform block 308 and, in the embodiment of FIG. 7, blocks 702, 704, 710, and 712. As a part of the transmission signal processing circuitry, a reference signal generator 15 may be provided. The reference signal generator 15 may be configured to carry out the process of FIG. 3 or any one of its embodiments. The reference signal generator may comprise a Zadoff-Chu sequence generator 14 configured to generate a Zadoff-Chu sequence for a reference signal. The reference signal generator 15 may further comprise a Zadoff-Chu sequence manipulation circuitry 16 configured to manipulate the Zadoff-Chu sequence according to any one of the above-described embodiments. As described above, the circuitry 16 may carry out blocks 302 and 304 to shift the Zadoff-Chu sequence cyclically in the frequency domain and, thereafter, extend the shifted sequence to the desired length. Optionally, the circuitry 16 may truncate the extended sequence to the desired length. The reference signal generator 15 may further comprise a time-domain shifting circuitry 18 configured to carry out block 306 and shift the reference symbol sequence according to a shifting parameter a allocated to a terminal device to which the PRBs carrying the reference symbol sequence are scheduled.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the configurations for the spectrum shaping by using the out-band PRBs. The memory 20 may further store a data buffer 28 for uplink data to be transmitted from the apparatus.

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii)

portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
at least one processor; and
at least one memory including computer program code, said at least one memory and computer program code being configured, with the at least one processor, to cause the apparatus to perform:
generating a Zadoff-Chu sequence for a reference signal;
performing a frequency-domain cyclic shift on the Zadoff-Chu sequence;
extending the cyclically shifted sequence to a desired length;
performing a time-domain cyclic shift on the sequence having the desired length, resulting in a reference symbol sequence; and
arranging the reference symbol sequence to at least some resource elements of a set of physical resource blocks.

2. The apparatus of claim 1, wherein the amount of said frequency-domain cyclic shift is based on a difference between a target length for the reference symbol sequence and the highest prime number smaller than the target length.

3. The apparatus of claim 2, wherein the amount of said frequency-domain cyclic shift is defined by $$-0.5(M_{ZC}-N_{ZC}+1) \text{ or}$$

$$1-0.5(M_{ZC}-N_{ZC}+1)$$

where $M_{ZC}$ is the target length, and $N_{ZC}$ is the highest prime number smaller than $M_{ZC}$.

4. The apparatus of claim 2, wherein the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, wherein the target length is a number of resource elements for the reference symbol sequence in the in-band physical resource blocks.

5. The apparatus of claim 1, wherein the at least one memory and computer program code are further configured, with the at least one processor, to cause the apparatus to extend the cyclically shifted sequence by at least copying a determined number of symbols at a tail of the cyclically shifted sequence to a head of the cyclically shifted sequence and by copying a determined number of symbols at the head to the tail.

6. The apparatus of claim 5, wherein the at least one memory and computer program code are further configured, with the at least one processor, to cause the apparatus to cyclically extend or truncate, after said copying, the sequence to the desired length.

7. The apparatus of claim 1, wherein the set of physical resource blocks comprises a set of in-band physical resource blocks arranged to carry a data signal and, on each side of the set of in-band physical resource blocks, at least one out-band physical resource block for a spectrum shaping signal, each physical resource block comprising said resource elements for the reference symbol sequence, and wherein the at least one memory and computer program code are further configured, with the at least one processor, to cause the apparatus to arrange the reference symbol sequence to the set of physical resource blocks such that at least one of the following conditions is satisfied:
a) a reference symbol in a resource element having the highest index in a first out-band physical resource block and a reference symbol in a resource element having the lowest index in a first in-band physical resource block, adjacent to the first out-band physical resource block, are adjacent reference symbols in the Zadoff-Chu sequence;
b) a reference symbol in a resource element having the lowest index in a second out-band physical resource block and a reference symbol in a resource element having the highest index in a second in-band physical resource block, adjacent to the second out-band physical resource block, are adjacent reference symbols in the Zadoff-Chu sequence.

8. The apparatus of claim 1, wherein the set of physical resource blocks comprises a set of in-band physical resource blocks arranged to carry a data signal and, on each side of the set of in-band physical resource blocks, at least one out-band physical resource block for a spectrum shaping signal, and wherein the desired length is $\beta M_{ZC}$ where $\beta$ is a spectral extension factor defining the number of out-band physical resource blocks in the set of physical resource blocks, and wherein $M_{ZC}$ is the number of resource elements for the reference symbol sequence in the in-band physical resource blocks.

9. The apparatus of claim 1, wherein the at least one memory and computer program code are further configured, with the at least one processor, to cause the apparatus to arrange, in an order starting from the first reference symbol, the reference symbol sequence to both said in-band physical resource blocks and said out-band physical resource blocks firstly in an order of increasing resource element index and secondly in an order of increasing physical resource block index.

10. The apparatus of claim 1, wherein all the reference symbols in the reference symbol sequence are in a cyclically increasing order.

11. The apparatus of claim 1, wherein all the reference symbols in the reference symbol sequence are in a cyclically increasing order, except for the first reference symbol at the head of the reference symbol sequence or the last reference symbol at the tail of the reference symbol sequence.

12. The apparatus of claim 1, wherein the at least one memory and computer program code are further configured, with the at least one processor, to cause the apparatus to arrange the reference symbols to the resource elements of the set of physical resource blocks according to the following table where each value, at a location defined by a combination of a physical resource block index and a resource element index, represents an index of the respective reference symbol in the Zadoff-Chu sequence:

| Resource element index | Physical resource block index | | | | | | | |
|---|---|---|---|---|---|---|---|---|
| | 0 | 1 | 2 | 3 | 4 | 5 | 6 | 7 |
| 0 | 10, 11, or 25 | 0 | 6 | 12 | 18 | 24 | 30 | 5 |
| 2 | 26 | 1 | 7 | 13 | 19 | 25 | 0 | 6 |
| 4 | 27 | 2 | 8 | 14 | 20 | 26 | 1 | 7 |
| 6 | 28 | 3 | 9 | 15 | 21 | 27 | 2 | 8 |
| 8 | 29 | 4 | 10 | 16 | 22 | 28 | 3 | 9 |
| 10 | 30 | 5 | 11 | 17 | 23 | 29 | 4 | 10, 11, or 25 |

13. The apparatus of claim 1, wherein the at least one memory and computer program code are further configured, with the at least one processor, to cause the apparatus to support both of the following transmission modes:
A) the set of physical resource blocks comprises a set of in-band physical resource blocks arranged to carry a data signal on each side of the set of in-band physical resource blocks, at least one out-band physical resource block for a spectrum shaping signal, and the means are configured to arrange the reference symbol sequence to both in-band and out-band physical resource blocks;
B) the set of physical resource blocks comprises the set of in-band physical resource blocks with no out-band physical resource block for the spectrum shaping signal, and the means are configured to arrange the reference symbol sequence only to the in-band physical resource blocks,
wherein the reference symbol sequence arrangement in the in-band physical resource blocks is the same in both transmission modes.

14. A method, comprising:
generating, by a transmitter apparatus, a Zadoff-Chu sequence for a reference signal;
performing, by the transmitter apparatus, a frequency-domain cyclic shift on the Zadoff-Chu sequence;
extending, by the transmitter apparatus, the cyclically shifted sequence to a desired length;
performing, by the transmitter apparatus, a time-domain cyclic shift on the sequence having the desired length, resulting in a reference symbol sequence;
arranging, by the transmitter apparatus, the reference symbol sequence to at least some resource elements of a set of physical resource blocks; and
transmitting, by the transmitter apparatus, the reference symbol sequence in the set of physical resource blocks.

15. A computer program embodied on a non-transitory computer-readable medium, said computer program comprising computer program code readable by a computer, wherein, when executed by the computer, the computer program code configures the computer to carry out a process comprising:
generating a Zadoff-Chu sequence for a reference signal;
performing a frequency-domain cyclic shift on the Zadoff-Chu sequence;
extending the cyclically shifted sequence to a desired length;
performing a time-domain cyclic shift on the sequence having the desired length, resulting in a reference symbol sequence;
arranging the reference symbol sequence to at least some resource elements of a set of physical resource blocks, and
causing transmission of the reference symbol sequence in the set of physical resource blocks.

* * * * *